INVENTOR
John Albert Krapf
BY McCoy, Greene + LeGrotenhuis
ATTORNEYS

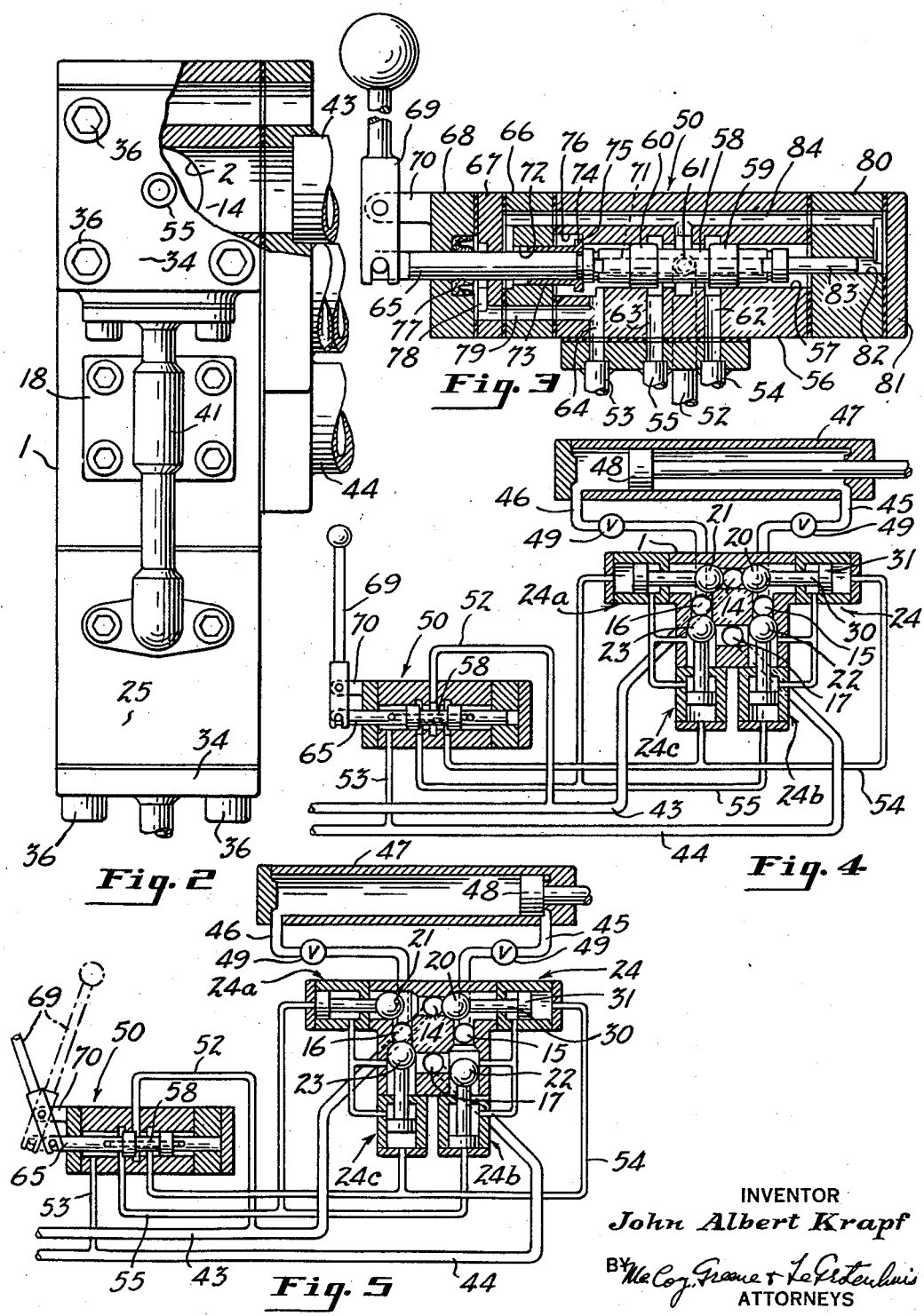

United States Patent Office 2,891,518
Patented June 23, 1959

2,891,518

VALVE MECHANISM FOR CONTROLLING DELIVERY OF FLUID UNDER PRESSURE TO A FLUID OPERATED MOTOR

John Albert Krapf, Cleveland Heights, Ohio

Application December 10, 1956, Serial No. 627,226

8 Claims. (Cl. 121—46.5)

This invention relates to fluid pressure control mechanism for controlling the delivery of fluid under pressure to and exhaust of fluid pressure from one or more service lines, and particularly to a control valve suitable for high pressure systems.

An important use of the present invention is to control the delivery of fluid under pressure to or exhaust of pressure from a fluid motor such as a cylinder and piston by means of a flow control valve in which the flow of fluid under pressure to and exhaust of pressure from one or more service lines is controlled by a plurality of valves in the control valve casing which are held in sealing engagement with annular seats by fluid pressure operated means and which are subjected when closed to line pressure which opposes the fluid pressure operated means which holds them closed. The use of valves that are held under pressure against their seats results in minimum leakage of fluid past the valves and the line pressure acting on the valves when closed insures instant full opening of each valve when the pressure holding it closed is released, thereby substantially eliminating erosion of the valve seats due to rapid flow of liquid across the seats such as is caused when a valve is positioned out of contact with but close to a seat. By reason of the effective seal, the valve of the present invention may be used with fluid in the form of a gas, or with a liquid of any viscosity and, by reason of the instantaneous full opening of the valves, erosion of valve seats is prevented. Since the valves are held against their seats by fluid pressure in opposition to line pressure acting on the valves, the valves act to relieve pressure in service lines and prevent creation of excessive pressures and relieve shocks due to surges of pressure such as may be caused by sudden stopping of a piston or other motor to which the service lines lead.

In the control mechanism herein illustrated the main control valve is designed to admit fluid under pressure to one service line while fluid is exhausted from another service line. For example, the two lines may be connected to opposite ends of a cylinder to move a piston in either direction. Means is also provided for stopping flow of fluid in both service lines, so that when the operating fluid is a liquid the motor may be positively held in any desired position.

The individual flow control valves are operated by fluid pressure motors that are controlled by a suitable pilot valve which is movable in either direction from a neutral position in which all of the movable valves of the main control valve are held in closed position, to open the valves which cause pressure to be relieved in either of the service lines and to be supplied to the other of the service lines.

By reason of the effective seals provided by the flow control valves, a piston may be held for substantial periods of time in a fixed position against thrusts applied in either direction thereto and, by moving the pilot valve momentarily in one direction or the other from its neutral position, the piston may be inched in either direction.

The four-way piston type control valves commonly employed in heavy duty hydraulic systems to control the operation of a motor in either direction or to hold the same against movement, are subject to slow leakage under severe pressure such as may occur when the piston or other motor is under heavy load. When the control valve is in its holding position thrusts exerted on the piston or other motor will result in slow drift of the piston if a heavy load is imposed upon it, such drift being greater when the hydraulic fluid is a fluid of low viscosity such as water.

Important objects of the present invention are to provide a control valve which is effectively sealed against leakage, so that a piston or other motor may be held in fixed positions under load for extended periods of time, to provide a control valve which will effectively seal against leakage of an actuating fluid of low viscosity, to provide a control valve that serves as a pressure relief valve for the service lines and to provide a control valve in which the fluid entering the valve through its inlet port is utilized as a valve actuating medium.

A further object of the invention is to provide a valve of simple, rugged, compact and inexpensive construction which can be quickly and easily assembled or taken apart for repair.

With the above and other objects in view, reference should be had to the accompanying drawings forming part of this specification in which:

Figure 2 is an end elevation of the control valve;

Figure 3 is a longitudinal section through the pilot valve;

Figure 4 is a diagrammatic view showing the position of the parts of the control valve when the pilot valve is in neutral position; and Figure 5 is a diagrammatic view similar to Fig. 4, showing the positions of the valve members in the control valve, with the pilot valve shifted in one direction out of neutral position.

Figure 1:
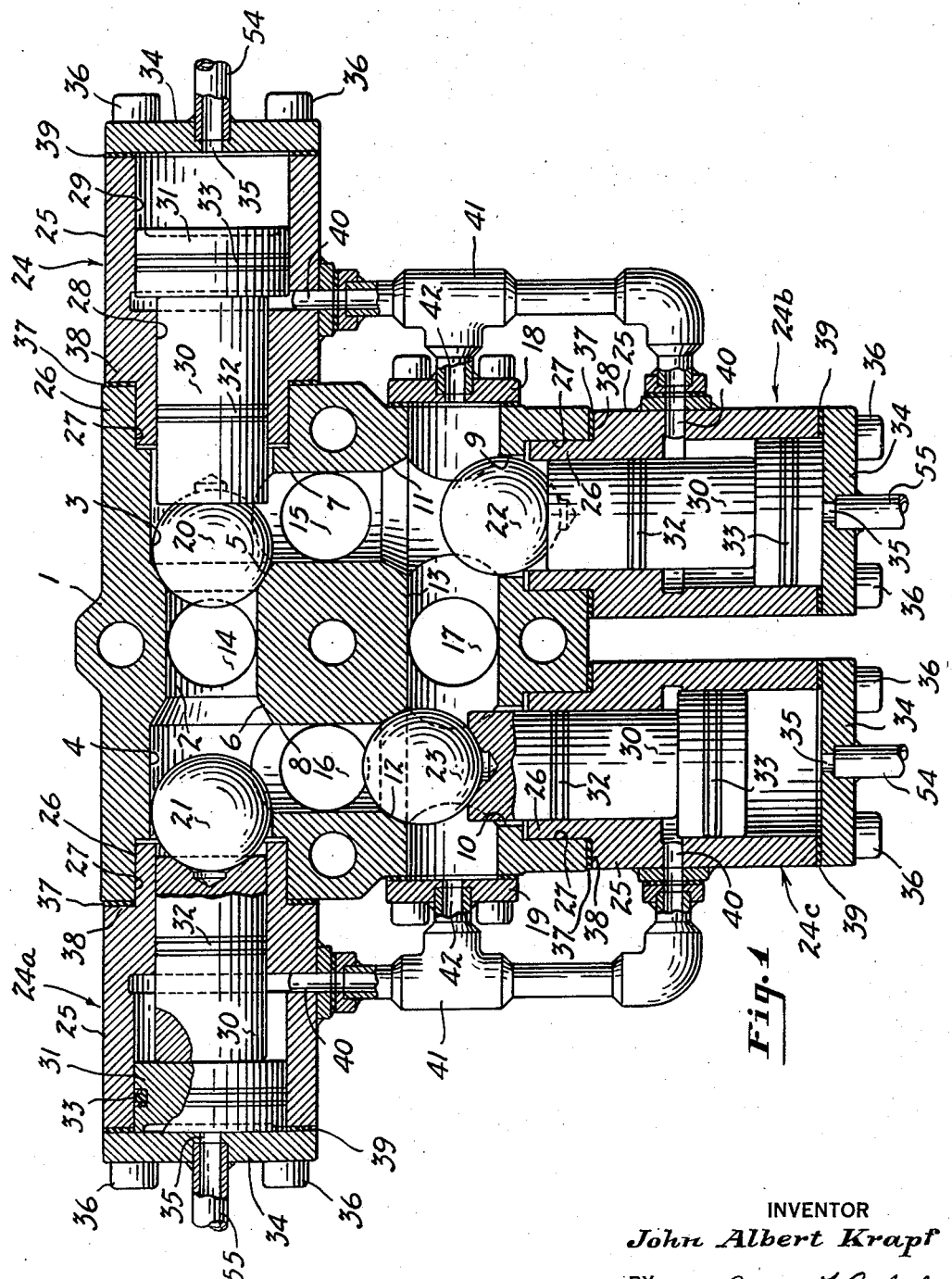
Figure 1 is a central, longitudinal section through the control valve of the present invention.

As shown in Fig. 1 of the drawings, the control valve of the present invention has a body in the form of a one-piece metal block 1 that has a passage extending through it formed by a bore 2 and counterbores 3 and 4 extending from opposite ends of the bore 2 and opening to opposite ends of the block 1. Shoulders 5 and 6 that are provided at the inner ends of the counterbores 3 and 4 are substantially conical in form to provide valve seats. Bores 7 and 8 are formed in the block 1 preferably at right angles to and communicating with the counterbores 3 and 4. Counterbores 9 and 10 extend from the bores 7 and 8 and open to one side of the block 1, the shoulders at the inner ends of the counterbores 9 and 10 being of substantially conical form to provide valve seats 11 and 12. A bore 13 extends longitudinally through the block 1, the bore 13 being spaced laterally from the bore 2 and counterbores 3 and 4 forming a second passage parallel with the first that is in communication with the counterbores 9 and 10, which with the bores 7 and 8 form cross passages connecting the bore 13 with the counterbores 3 and 4.

Pressure port 14 opens to the bore 2, service ports 15 and 16 open to the bores 7 and 8, and a drain port 17 opens to the bore 13. Closure members 18 and 19 are provided at opposite ends of the bore 13 to provide a drain chamber that maintains communication at all times between the counterbores 9 and 10 and the drain port 17. Valves 20 and 21 are mounted in the counterbores 3 and 4 for movement toward and away from the seats 5 and 6 to close communication between the pressure chamber formed by the bore 2 and either or both of the bores 7 or 8 with which the service line ports 15 and 16 communicate. Valves 22 and 23 are mounted for movement in the counterbores 9 and 10 for movement into and out of engagement with the valve seats 11 and 12 to cut off communication between either or both of the service line ports 15 and 16 and the drain port 17, or to establish communication between either one of the service line ports and the drain port 17.

The valves 20, 21, 22 and 23 are formed for sealing engagement with the valve seats 5, 6, 11 and 12 and may be in the form of balls which are slidable and rotatable in the counterbores 3, 4, 9 and 10 which serve as valve chambers. The valves 20, 21, 22 and 23 may be held in the position shown in Fig. 1 in which the valves 20 and 23 are in closed position and the valves 21 and 22 are in open position, so that fluid under pressure is supplied from the pressure inlet port 14 to the service line port 16 and in which the service line port 15 is cut off from the pressure port 14 and connected to the drain port 17. The valves 21 and 22 may be held in closed positions while the valves 20 and 23 are in open position to reverse the flow in the service lines.

The bore 2 provides a pressure chamber receiving fluid under pressure from the inlet port 14 and delivering through the outlets controlled by the valves 20 and 21 and the bores 7 and 8 provide control chambers which serve to connect the service ports 15 or 16 to pressure upon the opening of valve 20 or 21 or to drain upon the opening of valve 22 or 23 and which can be closed to both pressure and drain. Since the seats for each of the valves 20, 21, 22 and 23 face away from the chamber from which its opening is an outlet, the valves 20 and 21 are subjected to line pressure tending to open them when closed, the valve 22 is subjected to line pressure tending to open it while fluid under pressure is being delivered to the port 15 and the valve 23 is subjected to line pressure tending to open it while fluid under pressure is being delivered to the port 16, so that when the valves are positioned to deliver fluid under pressure through either service port 15 or 16 the closed valves are subjected to line pressure which presses them toward their open position.

The valves 20, 21, 22 and 23 may be moved into engagement with their seats by means of four identical fluid pressure motors 24, 24a, 24b and 24c. Each of the fluid pressure motors is of the cylinder and piston type having a cylinder block 25 having an inner end portion 26 of reduced diameter. The end portions 26 fit in counterbores 27 that are axially alined with the counterbores 3, 4, 9 and 10 that provide chambers for the valves 20, 21, 22 and 23. The cylinder block 25 has a bore 28 opening to its inner end and a counterbore 29 forming a piston chamber at its outer end. A thrust pin 30 has a slidable fit in the bore 28 and a piston 31 has a slidable fit in the counterbore 29. The pin 30 and the piston 31 have suitable sealing rings 32 and 33 to prevent leakage of fluid past them and the pin 30 is interposed between the piston 31 and the valve adjacent the inner end of the cylinder. The outer end of the counterbore 29 is closed by means of a head 34 that is provided with a port 35 for supplying fluid under pressure or exhausting fluid from the outer end of the piston chamber. The cylinder blocks 25 are secured to the valve body 1 by means of bolts 36 which serve to clamp sealing gaskets 37 between the shoulders 38 at the inner end of the cylinder blocks 25 and the outer portion 26 of the valve body 1. The bolts 36 also clamp the head 34 to the cylinder blocks, suitable gaskets 39 being interposed between the heads and cylinder blocks to seal the piston chambers.

A drain port 40 is provided at the inner end of the piston chamber of each of the motors 24, 24a, 24b and 24c and conduits 41 connect these ports to ports 42 in the closure members 18 and 19, so that the inner ends of all four piston chambers are connected at all times to drain.

Pressure is supplied to the inlet port 14 through the pressure conduit 43 of a fluid pressure system and the drain port 17 is connected to a drain conduit 44 of the fluid pressure system. In the embodiment of the invention herein illustrated service lines 45 and 46 connect the ports 15 and 16 to a fluid pressure motor such as a cylinder 47 having a piston 48 movable therein, the lines 45 and 46 being connected to opposite ends of the cylinder 47 to supply pressure to or to exhaust pressure from either end of the cylinder. The service lines 45 and 46 may be provided with suitable flow regulating valves 49.

It will be apparent that the pressure in the two service lines 45 and 46 may be equalized to stop the motor to which they lead either by closing the valves 20 and 21 or by closing the valves 22 and 23. It is preferred however to simultaneously close all four of the valves for the reason that failure of one of the valves to close would not affect the operation.

The valves 20, 21, 22 and 23 of the main control valve are controlled by a suitable pilot valve 50 which controls the supply of pressure to the valve actuating motors 24, 24a, 24b and 24c. The pilot valve is connected to the pressure conduit 43 by a line 52 and to the drain conduit 44 by a line 53. A service line 54 connects the pilot valve 50 with valve actuating motors 24 and 24c. A service line 55 connects the pilot valve 50 to the inlet ports 35 of the valve actuating motors 24a and 24b. The pilot valve 50 is operable to supply pressure to either of the service lines 54 or 55 and to simultaneously connect the other of the service lines to drain, and also to simultaneously connect the service lines 54 and 55 to pressure. The body of the pilot valve 50 may be in the form of a metal block 56 which is provided with a longitudinal bore 57 in which a piston valve 58 is slidably mounted. The valve 58 has longitudinally spaced piston portions 59 and 60 which have a sliding fit in the bore 57, the piston portions 59 and 60 being disposed on opposite sides of a centrally disposed pressure inlet port 61 to which the pressure line 52 connects. The spacing of piston portions 59 and 60 is such that they are disposed on opposite sides of the inlet port 61 in all positions of the valve 58. The valve body 56 is provided with service ports 62 and 63 on opposite sides of the pressure inlet port 61 and a drain port 64 to which the drain line 53 is connected opens into the bore 57 adjacent one end thereof. In the neutral position of the valve 58 both of the service ports 62 and 63 are in communication with the pressure inlet port 61 to supply pressure through the service lines 54 and 55 to motors 24, 24a, 24b and 24c to hold all four of the valves 20, 21, 22 and 23 in closed position. Upon movement of the valve 58 in either direction from its neutral position, one of the ports 62 or 63 is placed in communication with the drain port 64 while the other of the service ports remains in communication with the pressure inlet 61 to allow valve 20 or 21 to be opened by fluid under pressure entering through the inlet port 14 and the valve 23 or 22 to be opened by fluid under pressure entering the valve through port 16 or port 15.

An extension 65 of less diameter than the valve 58 is connected to one end of the valve 58 and extends through one of the heads of the valve 50 which is composed of three superposed closure members 66, 67 and 68. The outer end of the extension 65 is pivotally connected to a lever 69 that is pivoted on a bracket 70 attached to the outer closure member 68. By means of the lever 69 the valve member 58 may be shifted to the right or left of the neutral position shown in Fig. 3, far enough to move one of the piston portions 59 or 60 past the adjacent service port to place that port in communication with the valve chamber outwardly of the piston portion.

In order to connect both ends of the piston chamber at all times to the drain port, an axial passage 71 is provided in the valve 58, which permits free flow of fluid through the piston 58 from one end of the valve chamber to the other. The inner closure member 66 is provided with a bore 72 axially alined with the bore 57 which is of an internal diameter sufficiently greater than the diameter of the extension 65 to accommodate a sleeve piston 73 that slidably fits on the extension 65 and within the bore 72. The piston 73 has an enlarged inner end that engages with the valve 58 and also with the shoulder 75 at the inner end of a counterbore 76 in the body 56. The shoulder 75 is so positioned that the inward movement of the sleeve piston 73 is limited at a point where the valve 58 is in its neutral position. The outer closure member 68 is recessed on its inner face to receive a sealing ring 77 that surrounds the extension 65 to prevent leakage of fluid through the head and, in order to relieve the pressure of liquid acting on the sealing ring 77, the intermediate closure member 67 is provided with a central recess 78 in its outer face which faces the sealing ring 77 and which is connected by a passage 79 with the drain port 64, so that any liquid passing outwardly along the piston extension 65 through the closure member 67 can pass freely to the drain port.

The end of the valve body 56 opposite that through which the extension 65 extends is provided with a head composed of closure members 80 and 81. The inner closure member 80 is provided with a central bore 82 which receives a piston 83 that engages the end of the valve 58 opposite that engaged by the sleeve piston 73. The outer ends of the bores 72 and 82 receiving the pistons 73 and 83 are connected at all times to the pressure port 61 through a passage 84 in the valve casing. The area of the pressure receiving outer end face of the sleeve piston 73 is somewhat greater than the area of the pressure receiving outer end face of the piston 83, so that the pressure acting on the pistons 73 and 83 normally holds the valve 58 in the neutral position shown in Fig. 3. Movement of the valve 58 to the right from the neutral position moves the valve 58 out of engagement with the sleeve piston 73 which is held against movement to the right with the valve 58 by the shoulder 75. When the lever 69 is released pressure acting on the piston 83 returns the valve 58 to its neutral position. When the valve is moved to the left from the position shown in Fig. 3, the sleeve piston 73 is moved outwardly away from the shoulder 75 and upon release of the lever 69 pressure acting on the sleeve piston 73 moves the valve 58 to the right against the thrust exerted thereon by the piston 83, until the enlarged end 74 of the sleeve piston 73 engages the shoulder 75 and the valve 58 is returned to its neutral position.

When the valve 58 is moved to the right from the position shown in Fig. 3, communication between the service port 63 and the pressure inlet 61 is cut off and communication is established between the port 63 and the drain port 64, connecting the valve actuating motors 24a and 24b to drain through the service line 55 as indicated in Fig. 5. Release of pressure acting upon the pistons of the motors 24a and 24b allows the pressure acting on the inner faces of the valves 21 and 22 to force these valves to their outer limits of movement, connecting the port 16 and service line 46 to pressure and the port 15 and service line 45 to drain to move the piston 48 toward the right. Movement of the lever 69 in a direction to shift the valve 58 to the left causes the valves 20 and 23 to be opened while the valves 21 and 22 remain closed, to shift the piston in the opposite direction. The pilot valve is automatically returned to neutral position upon release of the lever 69 and in this position of the pilot valve the valves 20, 21, 22 and 23 are held in closed position as shown in Fig. 4. When the valves 20, 21, 22 and 23 are closed liquid is trapped in the service lines 45 and 46 and in the cylinder 47 to positively hold the piston 48 against movement in either direction. When pressure acting on either of the pistons holding the valves 20 and 21 in closed position is released, the line pressure acting on the valve so released is effected to rapidly shift the valve to its full open position, connecting one of the service lines 45 or 46 to pressure to move the piston 48 and apply pressure through the other service line to the inner face of the other control valve that has been relieved of pressure, so that an exhaust connection is instantly established to permit continued movement of the piston 48. By momentarily moving the control lever 69 in one direction or the other and allowing it to quickly return to neutral position, the piston 48 may be inched along the cylinder 47 and be positively held in various positions of adjustment.

The main cylinder block 1 can be readily machined to provide the fluid passages and valve seats and the operating cylinders 24, 24a, 24b and 24c can be formed by simple machining operations, and be quickly and easily attached to the valve body 1. The valves, thrust pins and pistons which are preferably separable, are easily assembled in the valve. By forming the valves, thrust pins and pistons separately, slight eccentricities of the bores 28 with respect to the counterbores 29 and with respect to the counterbores in the valve body 1 do not affect operation of the device, and close tolerances are not required.

The area of the pressure receiving faces of the pistons 31 is sufficiently greater than the cross sectional area of the bores 2, 7 and 8 to maintain an effective thrust on the valves 20, 21, 22 and 23, to prevent leakage past the valves when they are in closed position. Also, the line pressure acting on the valves when they are in closed position will quickly move them to full open position whenever the inward thrust applied through the pistons 31 is relieved. The rapid movement of the valves away from their seats minimizes erosion on the valves due to flow of liquid at high velocity between the valve seats and a closely adjacent valve.

The line pressure acting upon the piston 33 of motor 24c to hold the valve 23 in closed position as shown in Fig. 1 is opposed by the pressure existing within the valve chamber at the port 16 which normally would be substantially the same per unit of area as the pressure acting on the piston 33. The area of the face of the valve 23 exposed to the pressure within the valve chamber is considerably less than that of the piston 33 so that there is a substantial thrust on the valve holding it in closed position. However, a surge of pressure in the service line 46 such as might be caused by sudden stopping of the piston 48 may create a pressure in the valve chamber sufficiently in excess of the normal pressure to momentarily open the valve 23 in opposition to the pressure in the motor 24c. The fluid pressure in the line 45 acts upon the valve 22 in a similar manner. By properly proportioning the size of the pistons 33 to the size of the bores 7 and 8, the creation of pressures in either service line, 45 or 46, in excess of a predetermined maximum may be prevented.

It is to be understood that in accordance with the provisions of the patent statutes, variations and modifications of the specific devices herein shown and described may be made without departing from the spirit of the invention.

What I claim is:

1. A fluid pressure control mechanism comprising a valve casing having a central pressure chamber provided with an inlet port and axially alined end outlet openings, a valve chamber at each end of said pressure chamber, said valve chambers being of greater diameter than said openings and axially alined therewith, valve seats surrounding said openings and facing said valve chambers, a drain chamber spaced laterally from said first mentioned chambers and having an outlet port, a passage from each of said valve chambers to said drain chamber, a service line port communicating with each of said passages, a valve seat surrounding each of said passages and facing said drain chamber, a valve in each valve chamber movable into and out of engagement with the valve seat therein to close or open the pressure chamber outlet openings, a valve movable into and out of engagement with each valve seat facing said drain chamber, a fluid pressure operated means for applying closing pressure to each of said valves to move it into engagement with its seat and to hold the same in engagement with its seat against the opposing line pressure from said pressure chamber, and means for controlling said fluid pressure operated means to apply closing pressure to all of said valves and to release the closing pressure on the valve that closes the opening from the pressure chamber to either valve chamber and simultaneously release the closing pressure on the valve that closes the opening from the other valve chamber to the drain chamber.

2. A fluid pressure control mechanism as claimed in claim 1, in which each of said valves is in the form of a ball and each fluid pressure operating means is in the form of a cylinder having a piston that presses the ball valve toward its seat.

3. A fluid pressure control mechanism comprising a valve casing having a central pressure chamber provided with an inlet port and axially alined end outlet openings, an internally cylindrical valve chamber at each end of said pressure chamber, said valve chambers being of greater internal diameter than said openings and axially alined therewith, conical shoulders surrounding said openings and forming valve seats, a piston chamber at each end of said casing axially alined with said valve chambers and of greater internal diameter than said valve chambers, an axially alined bore of less diameter than said piston chamber connecting each piston chamber to the adjacent valve chamber, a piston in each of said piston chambers, a thrust transmitting member extending from said piston through said bore, a valve slidably fitting in each valve chamber between one of said thrust members and one of said seats, a drain chamber in said valve casing, passages connecting said valve chambers with said drain chamber, a service line port communicating with each of said passages, a drain control valve for opening and closing each passage between said service line port and said drain chamber, means for applying line pressure to said pressure chamber and to the outer ends of said piston chambers aligned therewith to hold said valves closed, means connecting the inner ends of said piston receiving chambers to said exhaust chamber, and means controlling the supply of pressure to said piston chambers to admit pressure to the outer ends of both chambers and to relieve the pressure in the outer end of either one to permit either valve to be opened by line pressure, and means for operating said drain control valves to open the passages to the drain chamber from the valve chamber that is closed to said pressure chamber.

4. A fluid pressure control valve comprising a valve block having two parallel passages extending therethrough and two cross passages connecting said parallel passages, the first of said parallel passages having a bore centrally thereof, counterbores axially alined with said bores and shoulders forming valve seats at the inner ends of said counterbores, said cross passages being disposed outwardly of said shoulders and each comprising a bore opening to one of said counterbores and a counterbore opening to the second of said parallel passages and valve seat shoulder at the inner end of said counterbore, closure members at the opposite ends of said second passage, a pressure port opening to said centrally disposed bore of said first passage, a drain port opening to said second passage, a service port opening to each of said cross passages, a valve slidable in each counterbore into and out of sealing engagement with the seat at the inner end of the counterbore, a fluid pressure cylinder attached to said block at the outer end of each of said counterbores, each cylinder having a piston receiving chamber and a bore at its inner end of less diameter than the piston chamber and opening to said piston chamber and to the adjacent counterbore, a piston in each piston chamber, a thrust transmitting member slidably fitting in said bore of less diameter and interposed between the piston in the piston chamber and the valve in the adjacent counterbore, means connecting the inner end of each piston chamber to said second passage and drain port, means for supplying pressure simultaneously to the outer ends of said piston chambers to close all of said valves, and means for relieving the pressure on either of the pistons alined with the pressure chamber to permit opening of the valve which it controls by the fluid pressure in said pressure chamber to admit fluid under pressure to either cross passage and for simultaneously relieving the pressure on the piston that operates the valve in the other cross passage.

5. A fluid pressure control mechanism as claimed in claim 4, in which the valve seats are substantially conical and in which the valves are in the form of balls slidable and rotatable in said counterbores.

6. A fluid pressure control mechanism comprising a valve casing having a pressure chamber that is provided with an inlet port and two outlet openings, two flow control chambers each communicating with said pressure chamber through one of said openings and each provided with a service line port and a drain outlet opening, a valve seat surrounding each of said outlet openings and facing away from the chamber from which its opening is an outlet, a valve mounted for movement into and out of sealing engagement with each of said seats, an actuating means associated with each valve for applying fluid pressure thereto to move it into engagement with its seat and to hold it in closed position against the fluid pressure in the chamber whose outlet is closed by the valve, and means for controlling movement of said valves comprising means for delivering fluid under pressure to the actuating means of all of said valves to hold all of said valves in closed position and means for releasing the pressure in the actuating means for the valve at either of the outlet openings of said pressure chamber to permit the valve to open and supply pressure to one of said control chambers and for simultaneously releasing the pressure in the actuating means that closes the valve at the drain outlet opening of the other of said control chambers.

7. A fluid pressure control mechanism as claimed in claim 6 in which the means for controlling movements of the valves is a control valve movable in either direction from a position in which pressure is delivered to the actuating means for each of the valves.

8. A fluid pressure control mechanism comprising a main valve having a casing provided with laterally spaced passages and spaced cross passages connecting the same, the first of said parallel passages comprising a bore centrally thereof and cylindrical counterbores axially alined therewith, said cross passages each comprising a bore opening to one of said counterbores and a counterbore opening to the second of said passages, a pressure inlet port opening to the bore of said first passage, a service port opening to the bore of each of said cross passages, a conical shoulder forming a valve seat at the inner end of each counterbore, a valve in each counterbore in the form of a ball slidable and rotatable therein, a fluid pressure cylinder axially alined with each counterbore, each cylinder having a piston chamber and a bore of less diameter than the piston chamber opening into the alined counterbore, a piston slidable in each piston chamber, a thrust member engaged by each piston and extending into the alined counterbore for engagement with a valve ball, means connecting the inner end of each piston chamber with said drain chamber, a fluid pressure conduit connected to said pressure inlet port, means for connecting the outer ends of said cylinders to said pressure conduit including a control valve through which fluid flows to and from said cylinders, said valve being movable in either direction from a position in which pressure is supplied to all the cylinders to hold all the valves in closed position, and means operable upon movement of said control valve in either direction for relieving the pressure on one of the valves in said first passage to admit fluid under pressure to one of said cross passages and for simultaneously relieving the pressure on the valve in the other of said cross passages.

References Cited in the file of this patent

UNITED STATES PATENTS

| | | |
|---|---|---|
| 663,727 | Christie | Dec. 11, 1900 |
| 2,376,918 | Hughes | May 29, 1945 |
| 2,451,013 | Ziskal et al. | Oct. 12, 1948 |
| 2,569,881 | Davies | Oct. 2, 1951 |
| 2,583,185 | McLeod | Jan. 22, 1952 |
| 2,778,342 | Ringman | Jan. 22, 1957 |